July 6, 1926.
L. F. BAASH
1,591,264
ATTACHMENT FOR FISHING TOOLS
Filed Oct. 10, 1923
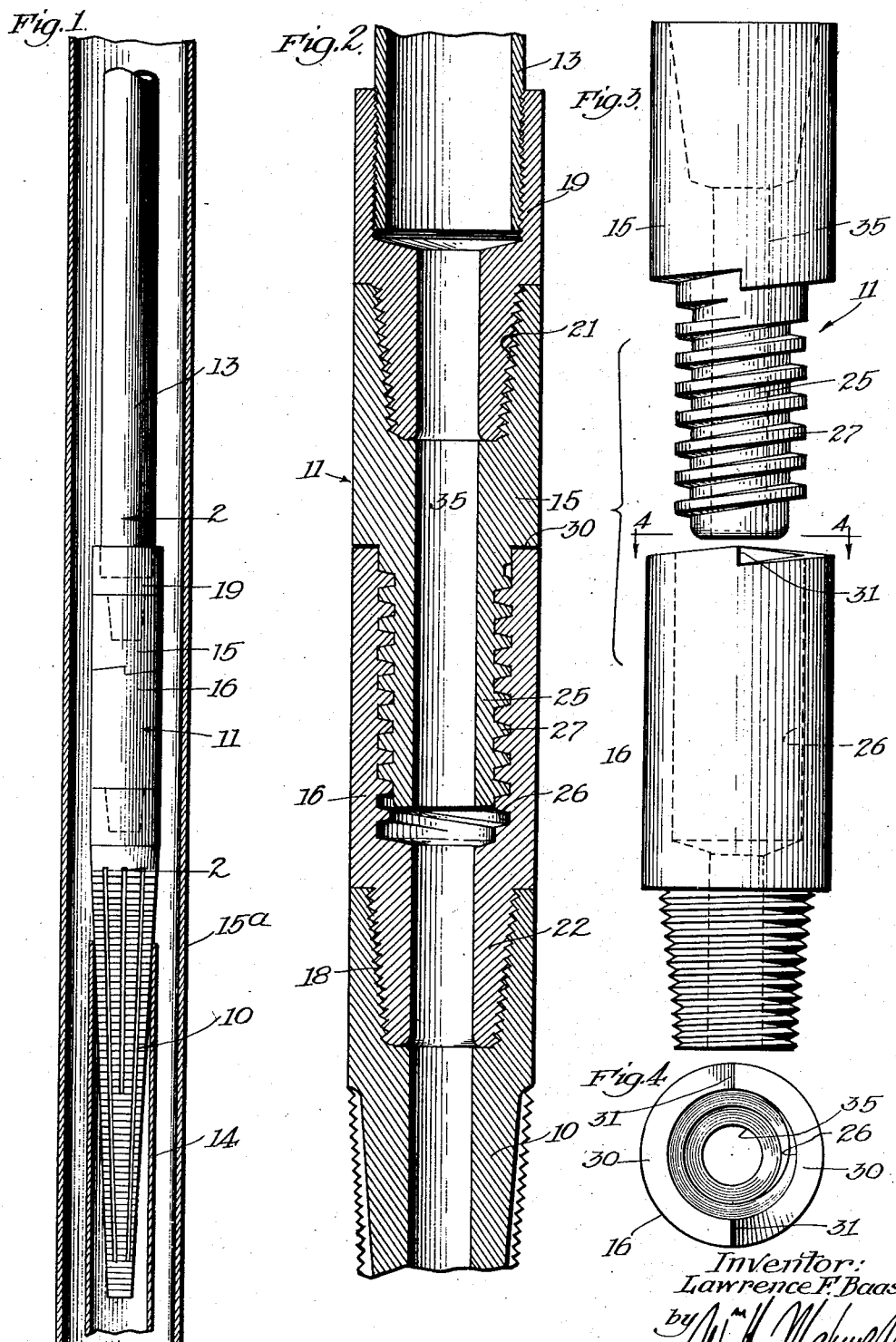
Inventor:
Lawrence F. Baash,
by his Attorney Patented July 6, 1926.

1,591,264

UNITED STATES PATENT OFFICE.

LAWRENCE F. BAASH, OF LOS ANGELES, CALIFORNIA.

ATTACHMENT FOR FISHING TOOLS.

Application filed October 10, 1923. Serial No. 667,760.

This invention relates to a device or attachment for use in connection with a fishing tool, and it is an object of the invention to provide an effective, reliable and practical device, such as I will hereinafter describe.

In drilling a well with the rotary method the bit or cutting tool is carried at the lower end of the drill pipe. The drill pipe is rotated by a rotary unit located at the derrick floor. It often happens that the drill pipe breaks or twists off for one reason or another making it necessary to fish the broken off part out of the well. To do this a tap, a die, or other suitable fishing tool is lowered into the well on a drill pipe, or the like, and is rotated or otherwise moved into engagement with the broken off drill pipe to grip it. Taps and dies of various forms are most commonly used, and in many cases it is difficult or impossible to rotate them into or onto the broken off drill pipe tightly enough to grip firmly. In practice care must be taken in rotating the drill pipe carrying the fishing tool to avoid twisting it off. Further, it quite often happens that the broken off part of the drill pipe cannot be lifted after it has been caught, thus making it necessary to endeavor to break or in some way release the broken off drill pipe.

It is an object of this invention to provide an attachment for a fishing tool, such as a tap or a die, whereby the fishing tool may be applied to a broken off drill pipe, or the like, to grip it in a particularly firm and secure manner.

Another object of this invention is to provide a device which is operable to jar an object around to loosen or otherwise operate upon it. The device is useful for attachment to a fishing tool to jar it around and thereby jar whatever object or objects there may be connected with the fishing tool.

Another object of this invention is to provide a device such as I have herein mentioned which is simple, small and compact, making it inexpensive, convenient to handle, and capable of being easily and quickly attached to a fishing tool for operation.

Another object of this invention is to provide a device such as I have herein mentioned including two separable parts screw threaded together with a free or loose thread so that they can be very easily disconnected, for instance, by a force that would not actuate an ordinary screw threaded connection.

The various objects and features of my invention will be best and more fully understood from the following detailed description of a typical preferred form and application of the invention, throughout which description reference is had to the accompanying drawings, in which:

Fig. 1 is a view illustrating the device provided by this invention, in combination with a tap, the tap being shown in position in a well engaging a broken off section of drill pipe;

Fig. 2 is an enlarged detail sectional view, showing the device of the present invention in combination with a drill pipe and tap, being a view taken as indicated by the line 2—2 on Fig. 1;

Fig. 3 is a side elevation of the device provided by this invention, the two parts of the device being shown separate; and Fig. 4 is an end view of one of the parts of the device, being a view taken as indicated by the line 4—4 on Fig. 3.

In accordance with the broader aspects of my present invention it may be included or embodied in a fishing tool, for instance, in a tap, a die or other such tool; however, in its preferred form the invention is in the form of an attachment suitable for application to and use in connection with any standard fishing tool. As I have hereinabove mentioned in a general way my invention is intended primarily for use in combination with fishing tools, it being particularly suited for use in combination with a tap or die, or die collar, or any other like or similar tool. Therefore, when I use the term fishing tool I mean to include not only the specific form or type of fishing tool illustrated in the drawings, but also any tool or device in combination with which the present invention can be employed, substantially as I will hereinafter describe.

In Fig. 1 of the drawings I have illustrated the device 11 provided by this invention in combination with a typical tap 10. The device 11 is arranged between the tap 10 and the drill pipe 13, which carries and operates the tap. The tap is illustrated in engagement with a broken off drill pipe 14 located in a well casing 15ª.

The device 11 provided by this invention includes, generally, two separable parts 15 and 16, adapted to be connected together end to end, and one with the fishing tool and the other with the drill pipe provided for carrying the fishing tool. The parts 15 and 16 are preferably round in cross sectional configuration and the same size in diameter as the parts to which they connect. In accordance with standard practice fishing tools are provided at their upper ends with a screw threaded socket 18 to receive the pin section 19 of a tool joint carried on the lower end of the drill pipe 13. The device 11 is preferably arranged between the drill pipe 13 and fishing tool 10, so, therefore, has one of its parts provided at its outer end with a screw threaded tapered socket 21 to receive the projection of the pin section 19 on the drill pipe and has its other part provided at its outer end with a screw threaded tapered projection 22 to fit the socket 18 in the fishing tool. The two parts of the device 11 may, therefore, be connected with the fishing tool and with the tool joint section 19 in much the same manner as tool joint sections are ordinarily connected together, the threads of the cooperating parts being fitted so that the parts fit tightly together and have to be broken apart as tool joint sections do. When the device is embodied permanently in a fishing tool one of its parts can be integral with the tool instead of being attachable thereto, as I have just described.

For the purpose of releasably connecting the parts 15 and 16 together one of them is provided at its inner end with a central screw threaded projection 25 and the other is provided at its inner end with a corresponding screw threaded socket 26. The projection 25 and socket 26 are uniform in size throughout their length and are preferably comparatively long. The threads 27 of the projection and socket are made deep and coarse so that they are particularly strong and are made to fit loosely or freely together. In practice the fit of the threads 27 is sufficiently free so that they offer practically no resistance to rotation between the parts 15 and 16 and can be disengaged by backing up the drill pipe 13 without breaking or releasing any of the other screw threaded connections in the drill pipe, or tool joints connecting the drill pipe, or any joints in connection with the device 11.

The inner or adjacent ends of the parts 15 and 16 are provided with helicoidal faces 30 and radially disposed shoulders 31 that are substantially transverse of the faces 30 and of the threads 27. Each of the parts 15 and 16 is provided with two faces 30 pitched in the same direction and having their adjacent ends connected by the shoulders 31. The faces 30 are located outward of or around the projection 25 and socket 26 and are semi-circular so that the shoulders 31 are diametrically opposite. The faces 30 of the two parts 15 and 16 are, of course, correspondingly pitched and related, as I have clearly shown throughout the drawings. The faces 30 are pitched substantially the same as the threads 27 and are related to the threads 27 so that the shoulders 31 at the ends of the two parts cooperate or abut to positively limit relative rotation between the parts 15 and 16 in a direction to screw the projection 25 into the socket 26. The shoulders 31 of the two parts contact before the projection 25 reaches the inner end of the socket 26 and before the corresponding faces 30 of the parts engage. The threads 27 being comparatively coarse it is possible to design and proportion the parts so that the shoulders 31 are comparatively large and have comparatively large engaging surfaces.

I provide central longitudinal openings 35 through the parts 15 and 16 so that fluid may be passed through the device from the drill pipe to the fishing tool just as it is ordinarily passed through an ordinary tool joint.

In employing the device 11 it is interposed between the fishing tool 10 and a suitable source of power or operating member such as a drill pipe 13. The upper part of the device is screw threaded onto the projection of the tool joint section at the lower end of the drill pipe, while the lower part of the device has its projection 22 screw threaded into the socket of the fishing tool. The two parts of the device are connected together by means of the projection 25 screw threading into the socket 26. The fishing tool is then lowered into the well in the usual manner until it engages the broken off drill pipe 14, or other fish that is to be removed from the well. The fishing tool is actuated to grip the drill pipe 14 by rotating the drill pipe 13 so that the desired rotary motion is imparted to the fishing tool through the device 11. The drill pipe 13 is, of course, rotated so that the projection 25 tends to screw thread into the socket 26 thereby causing the driving strain to be communicated between the two parts of the device 11 through the shoulders 31. When the fishing tool has been rotated into engagement with the broken off drill pipe 14 as tightly as is practical without danger of twisting off the drill pipe 13 the fishing tool may have ahold of the drill pipe 14 tightly enough to remove it from the well. However, in order to cause the fishing tool to further engage the drill pipe 14 and thereby make sure that the tool has tightly ahold of the drilling pipe 14 the drill pipe 13 is backed up a few turns (not enough to disengage the projection 25 from the socket 26) and is then rotated quickly in the forward direction causing the shoulders 31 of the upper part of the device to strike the shoulders 31 of the lower part so that the fishing tool is hammered or jarred around causing it to further engage the drill pipe 14. By repeating this operation several times, and with the proper force, the fishing tool can be hammered or jarred into tight and secure engagement with the drill pipe 14. With the fishing tool thus holding the drill pipe 14 the drill pipe 14 can be pulled out of the well by means of the drill pipe 13. However, if it is found that the drill pipe 14 is stuck or frozen so that it cannot be pulled the device 11 can be operated in the manner just described to jar the pipe 14 loose. It is apparent, of course, that the jarring of the fishing tool into engagement with the broken off drill pipe also jars the broken off drill pipe, and, in many cases, jars it loose so that it can be lifted as soon as the tool is secured. If, after the pipe has been jarred, it is still stuck so that it cannot be removed the drill pipe 13 can be backed up enough to disengage the projection 25 from the socket 26 whereupon the drill pipe 13 can be removed from the well allowing proper tools to be inserted to wash over the pipe 14. After washing over, or otherwise operating upon the pipe 14, the drill pipe 13 can be again lowered into the hole with the upper part of the device 11 on its lower end and the projection 25 screw threaded into the socket 26 to reconnect the drill pipe 13 and fishing tool so that the tool can be pulled by the drill pipe 13.

From the foregoing description it will be apparent that I have by my present invention provided an attachment for a fishing tool which is simple, inexpensive and convenient to handle, and, therefore, can be kept at hand in a rig ready for application to a fishing tool when an emergency arises. Further, it is to be particularly noted that the loose or free screw threaded connection between the two parts of the device not only allows for disconnecting of the parts without disconnecting any other screw threaded connections but also allows for operation of the device as a rotary jar.

If the screw threaded connection between the two parts of the device were an ordinary screw threaded connection the parts would not operate freely enough to permit them to be effectively jarred and they could not be separated without danger of some other connection becoming released.

Having described only a typical preferred form of my invention I do not wish to limit myself to the specific details hereinabove set forth but wish to reserve to myself any changes or variations that may appear to those skilled in the art or fall within the scope of the following claims:

Having described my invention, I claim:

1. A device for use in combination with a fishing tool including a part to be connected with the tool, a part to be connected with an operating member, means connecting the parts so that they are freely rotatable relative to each other and are separable by relative rotation in one direction, and means positively stopping the parts against relative rotation operable by relative rotation in the other direction.

2. An attachment for a fishing tool to be arranged between the tool and the operating member therefor, including a part to be connected with the tool, a part to be connected with said member, and means whereby one part can be jarred in a rotary direction from the other including, a freely operable screw threaded connection between the parts, and shoulders at the adjacent ends of the parts to abut upon operation of the screw threaded connection in one direction.

3. An attachment for a fishing tool to be arranged between the tool and the operating member therefor, including a part to be connected with the tool, a part to be connected with said member, and means whereby one part can be jarred from the other including, a screw threaded projection on one part to freely fit a screw threaded socket in the other part, and shoulders at the adjacent ends of the parts disposed transversely of the threads to abut upon screw threading the projection into the socket.

4. An attachment for a fishing tool to be arranged between the tool and the operating member therefor, including a part to be connected with the tool, a part to be connected with said member, and means whereby one part can be jarred from the other including, a screw threaded projection on one part to freely fit a screw threaded socket in the other part, and shoulders at the adjacent ends of the parts disposed transversely of the threads to abut upon screw threading the projection into the socket, the two parts of the attachment being the same size in diameter as the parts to which they connect.

5. A device of the character described to be arranged between two members one having a screw threaded socket the other a screw threaded pin including, two parts the same size in diameter as said members, a screw threaded pin at the outer end of one part to engage said socket, a screw threaded socket in the outer end of the other part to receive the first mentioned pin, a screw threaded projection on the inner end of one of said parts to freely fit a screw threaded socket in the inner end of the other part, the inner ends of the part having helicoidal faces pitched substantially the same as the threads of the projection and socket and transverse shoulders joining the ends of the faces, the shoulders being adapted to abut upon the projection being screwed into the socket.

6. A device for use in combination with a fishing tool including, a part for connection with the tool, a part to be operated by rotation of an operating member, a connection between the parts whereby they are freely rotatable relative to each other, and means whereby the part connected to the tool is jarred in a rotary direction by rotation of other part in one direction.

7. A device for use in combination with a fishing tool including, a part to be connected with the tool, a part to be connected with an operating member, connecting means between the parts allowing free relative rotation between the parts and operable to disconnect the parts by relative rotation between the parts in one direction, and means whereby the part connected with the operating member operates to jar the other part in a rotary direction by relative rotation between the parts in the other direction.

8. A device for use in combination with a fishing tool including, a part to be connected with the tool, a part to be connected with an operating member, a screw connection between the parts allowing free relative rotation between the parts and operable to disconnect the parts by relative rotation between the parts in one direction, and means whereby the part connected with the operating member operates to jar the other part in a rotary direction by relative rotation between the parts in the other direction.

9. A device for use in combination with a fishing tool including, a part to be connected with the tool, a part to be connected with an operating member, connecting means between the parts allowing free relative rotation between the parts and operable to disconnect the parts by relative rotation between the parts in one direction, and shoulders on the parts movable into cooperative engagement to cause jarring of one part in a rotary direction by relative rotation between the parts in the other direction.

10. In combination, a fishing tool, a rotatable operating member for connecting the tool to a fish by rotation, and a connection between the operating member and the tool operable by rotation of the operating member to impart a rotary jar to the tool.

11. A device for connecting a rotatable operating member and a fishing tool including, a part to be directly connected with the operating member, a part to be directly connected with the tool and a direct connection between the parts whereby the part connected with the tool is jarred in a rotary direction by rotation of the part connected with the operating member.

In witness that I claim the foregoing I have hereunto subscribed my name this 3rd day of October 1923.

LAWRENCE F. BAASH.